July 6, 1948. H. O. EBY 2,444,768
EDUCATIONAL GAME DEVICE
Filed Aug. 13, 1945 2 Sheets-Sheet 1
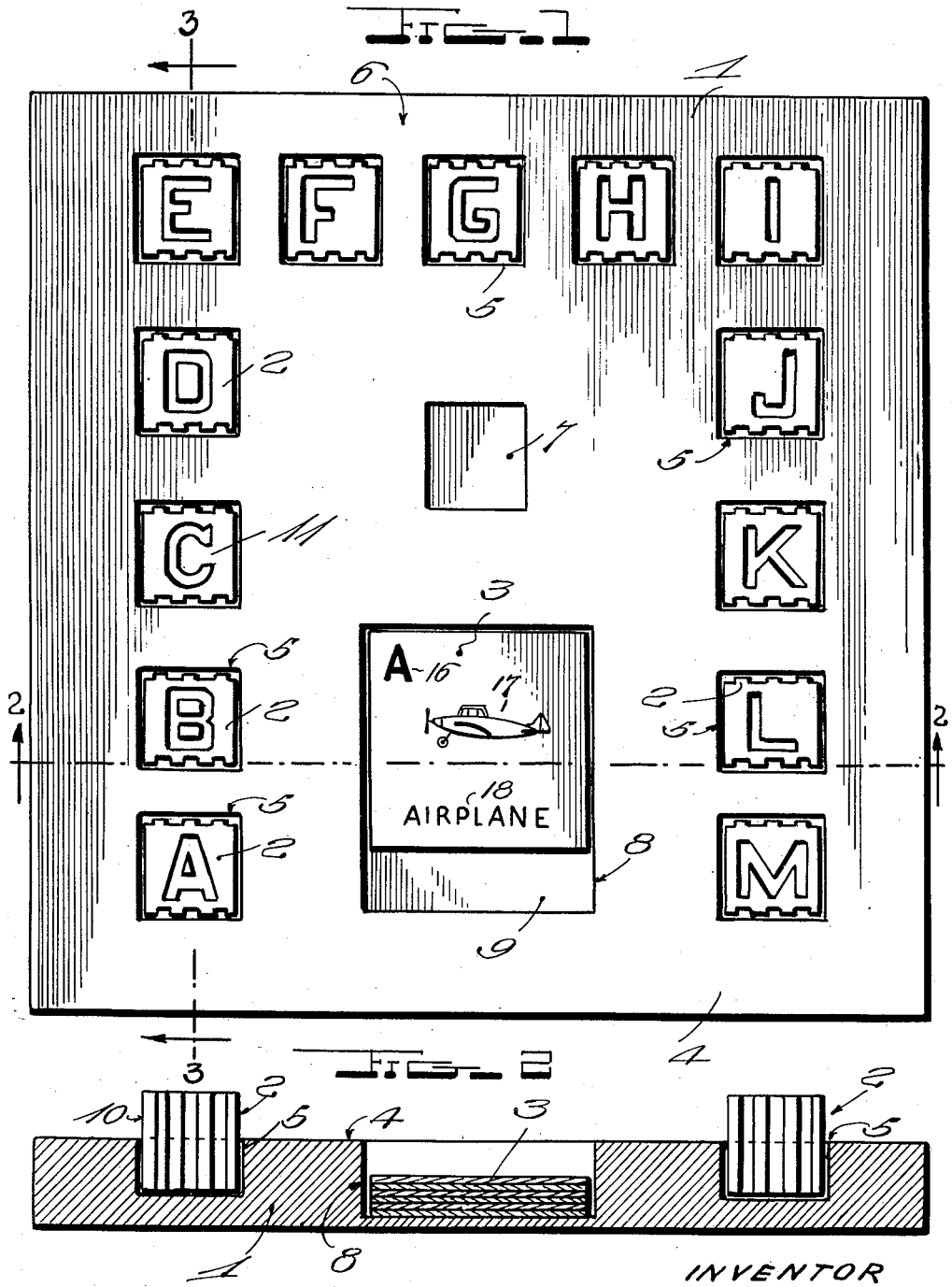
INVENTOR
HERBERT O. EBY,
by
Shreve, Crowe & Gordon
ATTORNEYS July 6, 1948.  H. O. EBY  2,444,768
EDUCATIONAL GAME DEVICE
Filed Aug. 13, 1945  2 Sheets-Sheet 2
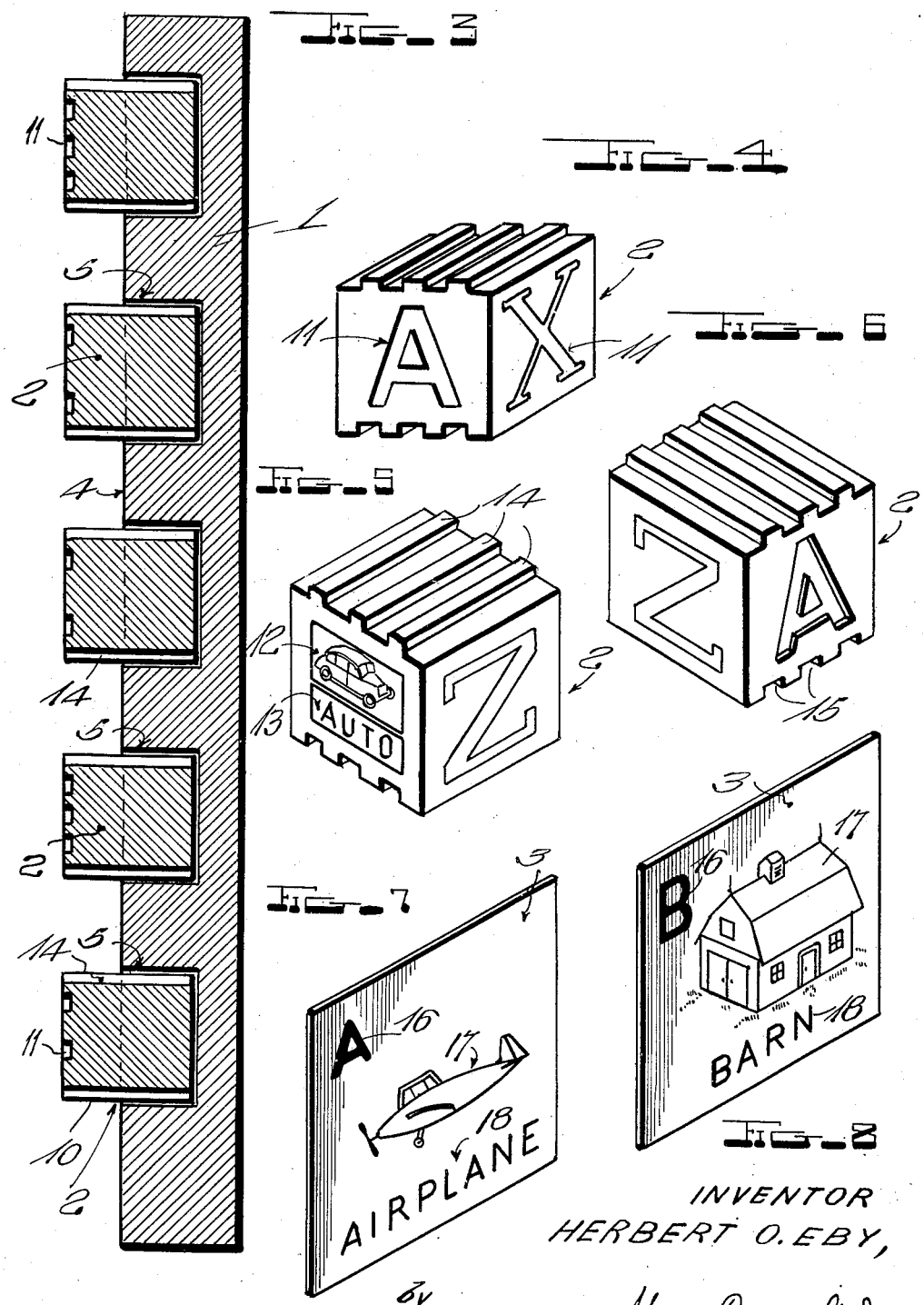
INVENTOR
HERBERT O. EBY,
by Shreve, Crowe & Gordon
ATTORNEYS Patented July 6, 1948

2,444,768

UNITED STATES PATENT OFFICE 2,444,768

EDUCATIONAL GAME DEVICE

Herbert O. Eby, Pittsburgh, Pa.

Application August 13, 1945, Serial No. 610,537

1 Claim. (Cl. 35—73)

Generically this invention relates to games and amusement devices for children, but it more especially is directed to a game embodying educational and self-teaching characteristics adapted in course of play to develop coordination of the hand, the eye, and the mind.

One of the principal objects of this invention is the provision of a game or educational device including game pieces or blocks having educational indicia thereon and a game board formed in its surface with a plurality of recesses adapted to receive and normally hold the respective blocks in playing arrangement and with a primary well conforming in configuration to said recesses adapted to receive and display each block as it is selectively put into play, the physical mechanics, always pleasing to children, of transferring the block from its recess to the well and back to its recess not only interests the child but develops coordination of the hand, the eye, and the mind, and impresses on the latter the particular indicia exposed to view on the block.

An important object of this invention is the provision of a game and educational device of this character, more especially for young children, comprising game pieces or blocks having on their respective faces alphabetical and/or pictorial indicia and a game board formed in its surface with a plurality of recesses or openings conforming to and adapted to receive and partially house the respective blocks, and a well corresponding to said recesses formed in said surface in off-set relation with respect to said recesses, in which is adapted to be placed each block as it is selectively moved from its recess and put in play, and which latter is completed upon the return of the block to its recess, whereupon for the next play a block carrying different indicia is put in play, as before.

A further important object of this invention is the provision of a game and educational appliance of this character comprising indicia-bearing block game pieces corresponding in number to one half of the alphabet, and on one surface of which are the letters from A to M and on another surface the letters from N to Z, and a game board formed in its surface with a series of block receiving recesses corresponding to the number of blocks, a primary opening or well in which is placed each block when in play, said well being out of alignment with respect to said recesses, and said board also being formed adjacent to said well with a larger well or rectangular recess or opening adapted to receive a number of cards having on each surface a word and a pictorial representation of what the word spells with the first letter of said word separately and distinctively displayed and corresponding to that on a block, whereby the field of play and educational and self-teaching characteristics with respect to each letter on the respective blocks is extended by the association therewith of a word and a picture of what the word stands for by placing the card in play following that of the block, the construction of the game board and arrangement of the recesses and secondary card well being such as to additionally constitute means for holding and carrying said blocks and cards when not in use.

With these and other objects in view, which will become apparent as the description proceeds, the invention resides in the construction, combination and arrangement of parts, hereinafter more fully described and claimed, and illustrated in the accompanying drawings, in which like characters of reference indicate like parts throughout the several figures, of which:

Fig. 1 is a plan view of my improved game board and educational appliance;

Fig. 2 is a cross section on the line 2—2 of Fig. 1 showing the blocks in elevation and a portion of the cards in transverse section.

Fig. 3 is a cross section taken on the line 3—3 of Fig. 1.

Figs. 4, 5, and 6 are perspective views showing the indicia on different sides of one of the blocks or game pieces.

Fig. 7 is a view showing the indicia on one surface of one of the player cards.

Fig. 8 is a view of the reverse surface of the card illustrated in Fig. 7.

People learn by doing. Therefore, in order to give young children from one to eight years of age a means of learning by doing, this fascinating game was designed.

Briefly, the fundamental principle underlying this game is the arrangement of blocks in a pattern, each fitted into a recess formed in the surface of the board or box, which latter also functions to contain and carry the blocks when not in use. The child soon learns to make a game out of taking a block out of its recess, placing it in a similar, normally empty, recess in the board at a point removed from its normal position, and this act of causing the particular block in play to stand out in disassociated relation from the general pattern arrangement tends to further focus or center the child's attention thereon and which is additionally emphasized by the act of putting it back in its recess. It is this process—taking and putting back—which makes the game so much fun for the child, and, incidental thereto, and which is most important, while the child is putting and taking he or she is, without conscious effort, learning to coordinate the hand, the eye, and the mind. Thus by association of a lettered block, for example, with a picture bearing the same letter, the child not only learns the name of the letter but the meaning of the picture as well, and, therefore, it is the handling of something tangible which helps the child to remember the letter, word, or picture that the particular blocks stands for.

In the illustrated embodiment characterizing this invention there is shown a square game board 1, a series of blocks or player pieces 2, and a series of cards or player pieces 3.

The game board 1 is formed in its surface 4 with a pair of parallel vertically extending rows of square recesses or openings 5 connected at their upper ends with a row of similar recesses or openings 5, said rows effecting an inverted substantially U-shaped outline or pattern 6. Formed centrally with respect to the vertical rows of recesses 5 in the upper portion of the pattern 6, normally empty, but in which is adapted to be placed when in play a block 2, is a primary recess or well 7 similar in dimensions to the recesses 5, and spaced below said primary well is a secondary recess or well 8 of larger dimensions and in the present instance rectangular in configuration, and adapted to contain cards or player pieces 3 arranged in stacked or superimposed relation and which will hereinafter be more fully explained. Also, said well 8 is of a dimension greater in one direction than said cards 3 to provide a thumb or finger space 9, for inserting and removing and for readily reversing the topmost card to successively expose to view the opposite surface of the card, as and for a purpose directly more fully appearing.

In the present instance the game board 1 is square in configuration and is constructed from one piece of suitable material such as paper, wood, plastic, or the like, and the recesses 5 are of a depth to partially house the respective blocks and to normally maintain them seated therein, but with their upper portions projecting sufficiently beyond the surface of the gameboard to provide a hand gripping area or handle means 10 for removing the blocks from their respective recesses to the primary well 7 and back to said recesses during course of play. While the gameboard is shown as above described, it will be understood that if desired it may be constructed from a similarly dimensioned cardboard box having openings formed in the top or horizontal surface thereof spaced from its bottom a distance corresponding to the depth of said recesses 5, and having openings formed therein providing in effect a series of slots or recesses corresponding to recesses 5 and wells 7 and 8, without departing from the scope and spirit of this invention.

Figs. 4, 5 and 6 show the formation and indicia bearing surfaces of one of the blocks or player pieces, 2, and as all of the blocks are identical, with the exception that each carries a different letter of the alphabet and associated indicia, only one will be described in detail.

The indicia carried by the blocks, namely, the letters of the alphabet designated generally as 11, picture of an object beginning with one of the letters carried by the block designated generally as 12, and a word spelling the name of the picture associated therewith designated generally as 13. In the present instance the upper surface of the block is formed with a series of spaced parallel upstanding ribs or tongues 14, and the undersurface is formed with a corresponding series of grooves 15 in alignment with said ribs, so that the ribs and grooves are adapted for respective and interchangeable engagement with the contiguous grooves and ribs of an adjacent block, whereby said blocks may be used as building blocks if desired. This conventional tongue and groove construction forms no part of the present invention.

As shown in Fig. 4 one surface of the block is formed with one of the alphabetical characters 11 or letter A and it is to be understood that these letters may be cut-out, printed, stencilled or otherwise suitably formed on said surface as desired. The adjoining surface is similarly formed with the letter X. On the opposite surface from the letter A (Fig. 5) there is formed a representation or picture of an automobile 12, and below thereof is formed the word "Auto" 13, and on the adjoining surface, which is opposite the letter X, is formed the letter Z. At this point it might be well to state that one surface of each block in the arrangement in Figure 1 carries a respectively different letter of the first half of the alphabet, i. e., "A" to "M" and another surface of each block carries a respectively different letter of the second half of the alphabet, i. e., "N" to "Z." It will therefore be noted that the letters of the alphabet occupy two of the plane surfaces and certain of the remaining two may carry words and pictures associated with one of the letters on the block and the remaining ones may carry certain duplicate letters such as Z (Fig. 6), or the remaining plane surface instead of a letter Z may carry a picture beginning with said letter X so that each block will carry a letter from the first half of the alphabet and another surface will carry a letter from the second half of the alphabet and one of the remaining plane surfaces will carry a word and a picture, the first letter of which is from the first half of the alphabet and the other surface similarly with a picture and word from the second half of the alphabet, as and for a purpose directly and more fully appearing.

In Fig. 7 there is shown one of the cards or plaques 3 on one surface of which is additional indicia adapted to cooperatively extend the sequence of play with respect to the letter A (Fig. 4) when the block carrying said letter is in play and positioned in the primary well 7, said indicia comprising the letter A 16, distinctively displayed at the top of the card, the pictorial representation 17 of an airplane positioned below said letter and the word "Airplane" 18, defining said picture positioned therebelow. Fig. 8 shows the reverse side or surface of Fig. 7, the indicia thereon arranged in a manner similar to Fig. 7 distinctively displaying the letter B 16, below said letter the picture of a barn 17 and beneath the picture the word "Barn" 18, thereby extending the play with respect to the letter B when the block carrying said letter is in play in said primary well, as explained in connection with block A, and similarly with respect to the letters carried by all the blocks shown in pattern 6 as hereinafter more fully explained.

While the manner of play and the educational and inherent self-teaching characteristics are thought to be clear from the above description, it might be well to further describe the operation and course or sequence of play as follows:

As above stated, this game has a community of purpose including educational characteristics, as well as the idea of amusement for young children. Initially the young child is instructed as to what the letters are on the blocks, and as to the system of play, that is, the blocks being in position as shown in Fig. 1, block A is gripped by the portion 10, removed from its initial position and put into play by positioning it in the primary well 7, whereby the child soon learns to return the block to its initial recess and then following the same operation with respect to block B and successively, until each block from A to M has been similarly played. After the child has become familiar with the first half of the alphabet the blocks are positioned in the recesses 5, so that the exposed surfaces of said blocks bearing the alphabetical characters from N to Z are arranged as shown in Fig. 1 with respect to the letters A to M, the sequence of play is repeated with the blocks from N to Z, and the child in amusing itself, at the same time learns the alphabet.

When the child has become thoroughly familiar with the alphabet by the manipulation of the blocks as above described, the play may then be extended by placing the block A in the primary well 7, as above described, and then for the next play, arrange the cards 3 in the well 8 to display on the exposed surface a letter in the upper corner corresponding to the letter on the block in well 7 and observing that the first letter of the word at the bottom is the same as the letter on the block and becoming familiar with the picture and the word, the child soon learns what the picture represents and the spelling of the word at the bottom defining the picture. When the child has thus played all the blocks from A to M, the sequence of play follows in like manner with respect to the letters N to Z on the blocks and with the similar letters on the cards thereby extending the play, and at the same time effecting the self-teaching of the child while being amused.

As the child progresses the system of play likewise may be progressed so that after he or she has learned the words and pictures of the cards 3, the blocks 2 may then be arranged in pattern 6 with the indicia on one surface of each block positioned in its recess 5 so as to expose the picture 12 and the word 13 beginning with the letter A, similarly with the indicia beginning with the letter B on the next block, and so on with the respective blocks to the word beginning with M, and when the child has learned such indicia, the blocks are rearranged in recesses 5 to expose the indicia, including the words beginning with the respective letters from N to Z.

It will be apparent that the amusement and educational game as above described, embodies three playing phases, that is, first, the play being confined to the use of the player pieces or blocks in connection with the alphabetical characters; second, when the child has learned the alphabet, the blocks beginning with A are played as before and the game is extended or enlarged following the placing of each alphabetical character in the primary well 7, by next arranging the player pieces 3 in the secondary well 8 so that the exposed surface of the topmost card will present the same alphabetical character as the one in the primary well and a picture and a word defining the picture, the first letter of both corresponding to the letter on the card and on the block in the well, and, third, by playing the game as in the first instance with the blocks except that instead of an alphabetical character on the exposed surface of the respective blocks as arranged in the pattern 6, there will be presented a picture and the word defining the picture, the first letter of both corresponding to an alphabetical character on said block, but not exposed, thereby further extending the course of play and the educational and self-teaching characteristics incident thereto as heretofore explained.

It will be apparent that I have designed an educational game device including a game board formed with a series of recesses adapted to receive a plurality of, in the present instance, square blocks, certain surfaces of each block formed with alphabetical characters and other surfaces of said block formed with pictures, and words defining the pictures, said recesses being arranged to define a pattern, said board being formed with a primary well adapted to successively receive the blocks from said recesses as heretofore explained and, a secondary well of larger dimensions formed in said board adapted to receive a plurality of indicia bearing cards as heretofore explained, said wells being arranged within the pattern in spaced relation in a manner such that the secondary well will in effect close the lower open end of said pattern and the primary well will be located substantially centrally of the open space intermediate the said secondary well and the upper closed end of the pattern, so that not only a compact playing surface is provided but by reason of the arrangement of the recesses, and the wells with respect thereto and each other, easy manipulation of the block and card player pieces in course of play is effected, and at the same time said game device is susceptible of manufacture at a minimum of cost.

Although in practice I have found that the form of my invention illustrated in the accompanying drawings and referred to in the above description as the preferred embodiment is the most efficient and practical, yet realizing that conditions concurrent with the adoption of my invention will necessarily vary, I desire to emphasize that various minor changes in details of construction, proportion and arrangement of parts, may be resorted to within the scope of the appended claims without departing from or sacrificing any of the principles of this invention.

Having thus described my invention, what I desire protected by Letters Patent is as set forth in the following claim:

In an educational game device, a game board formed with a series of recesses arranged in a definite pattern adapted to receive a corresponding plurality of blocks, said board being formed with a primary well within said pattern corresponding in dimensions to said recesses, and a secondary well within said pattern, a series of player pieces in said secondary well, each carrying on opposite surfaces, respectively, an alphabetical character, a picture and a word defining said picture, the first letter of the word defining said picture corresponding to said associated alphabetical character, a series of indicia bearing blocks of dimensions substantially corresponding to said recesses, one surface of the respective blocks being formed with an alphabetical character of the first half of the alphabet and another surface with an alphabetical character of the second half of the alphabet, two other surfaces of the blocks, one formed with a picture and a word defining the picture, each of the latter beginning with an alphabetical character of the first half of the alphabet, and the other surface formed with a picture and a word defining the picture, each of the latter beginning with an alphabetical character of the second half of the alphabet, said blocks adapted for successive arrangements in the recesses of said pattern to successively expose the respective indicia bearing surfaces thereof, each block adapted to be selectively positioned in said primary well, first, with an alphabetical character exposed, second, with an alphabetical character exposed, in conjunction with the exposing of a corresponding alphabetical character and associated indicia beginning with said character on a respective player piece in said secondary well, and, third, with a picture and word exposed.

HERBERT O. EBY.

REFERENCES CITED

The following references are of record in the file of this patent:

UNITED STATES PATENTS

| Number | Name | Date |
|---|---|---|
| 462,376 | Cowan | Nov. 3, 1891 |
| 557,307 | Foster | Mar. 31, 1896 |
| 641,739 | Thompson | Jan. 23, 1900 |
| 741,903 | Gates | Oct. 20, 1903 |
| 1,327,775 | Platt | Jan. 13, 1920 |
| 1,394,620 | Haupt | Oct. 25, 1921 |
| 1,613,204 | Smith | Jan. 4, 1927 |
| 1,698,739 | Schulman | Jan. 15, 1929 |
| 1,980,637 | Savory | Nov. 13, 1934 |